United States Patent
Yamada et al.

(10) Patent No.: US 7,177,647 B2
(45) Date of Patent: Feb. 13, 2007

(54) RESOURCE ALLOCATION CONTROL DEVICE, RESOURCE ALLOCATION CONTROL METHOD, AND MOBILE COMMUNICATION SYSTEM

(75) Inventors: Mayu Yamada, Yokohama (JP); Masayuki Koshino, Sagamihara (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 50 days.

(21) Appl. No.: 10/713,164

(22) Filed: Nov. 17, 2003

(65) Prior Publication Data

US 2004/0106420 A1 Jun. 3, 2004

(30) Foreign Application Priority Data

Nov. 19, 2002 (JP) ............................. 2002-335693

(51) Int. Cl.
*H04Q 7/20* (2006.01)
(52) U.S. Cl. .................. 455/450; 455/452.2; 370/328
(58) Field of Classification Search ................ 455/423, 455/450, 451, 452.1, 452.2; 370/328, 252
See application file for complete search history.

(56) References Cited

U.S. PATENT DOCUMENTS

| | | | |
|---|---|---|---|
| 5,708,655 A | | 1/1998 | Toth et al. |
| 6,618,592 B1 * | | 9/2003 | Vilander et al. ......... 455/452.1 |
| 6,721,278 B1 * | | 4/2004 | Rimhagen et al. .......... 370/252 |
| 2002/0012328 A1 * | | 1/2002 | Emanuel et al. ............ 370/328 |

FOREIGN PATENT DOCUMENTS

| | | |
|---|---|---|
| EP | 1 168 754 | 1/2002 |
| JP | 11-41293 | 2/1999 |
| WO | WO 01/13599 | 2/2001 |
| WO | WO 02/15621 A1 | 2/2002 |

OTHER PUBLICATIONS

IDG Information Communication Series, pp. 134-228, "Wireless Broadband Textbook", (with partial English translation).

* cited by examiner

*Primary Examiner*—Erika A. Gary
(74) *Attorney, Agent, or Firm*—Oblon, Spivak, McClelland, Maier & Neustadt, P.C.

(57) ABSTRACT

An object of the present invention is to provide a resource allocation control device, resource allocation control method and a mobile communication system, which can sufficiently decrease the control load and the delay when a RAN and IP network are connected. The mobile communication system is comprised of the RAN and the IP network which are connected via the resource allocation control device. The RAN is comprised of a plurality of BTSs and BSCs where MS can be connected, and the IP network has an IP transfer device. The resource allocation control device which intervenes between the RAN and the IP network, comprises a request acceptance section, correspondence processing section, allocation data base and allocation/assignment processing section, which are sequentially connected, and each of the BSC and the IP transfer device is connected to the request acceptance section and to the allocation/assignment processing section.

6 Claims, 11 Drawing Sheets

Fig.5

| ALLOCATED DATA OF BTS 12 | |
|---|---|
| RADIO ACCESS CHANNEL | IP PORT |
| B | 2 |
| D | 6 |
| E | 4 |
| A | 3 |

| UNALLOCATED DATA OF BTS 12 | | |
|---|---|---|
| RADIO ACCESS CHANNEL | | IP PORT |
| F | | 5 |
| K | | 8 |

Fig.8

| ALLOCATED DATA OF BTS 12-1 | |
|---|---|
| RADIO ACCESS CHANNEL | IP PORT |
| C | 2, 9 |
| D | 6 |
| E, J | 4 |

| ALLOCATED DATA OF BTS 12-2 | |
|---|---|
| RADIO ACCESS CHANNEL | IP PORT |
| B | 8 |
| D | 6 |
| E, J | 4 |

| UNALLOCATED DATA OF BTS 12-1 | | |
|---|---|---|
| RADIO ACCESS CHANNEL | | IP PORT |
| A | | 3 |
| B | | 5 |
| K | | 8 |

| UNALLOCATED DATA OF BTS 12-2 | | |
|---|---|---|
| RADIO ACCESS CHANNEL | | IP PORT |
| C | | 3 |
| F | | 5 |
| K | | 8 |

Fig.9

| ALLOCATED DATA OF BTS 12-1 | |
|---|---|
| RADIO ACCESS CHANNEL | IP PORT |
| C | 2, 9 |
| D | 6 |
| E, J | 4 |
| A, B | 3 |

| ALLOCATED DATA OF BTS 12-2 | |
|---|---|
| RADIO ACCESS CHANNEL | IP PORT |
| B | 8 |
| D | 6 |
| E, J | 4 |
| C | 3 |

| UNALLOCATED DATA OF BTS 12-1 | | |
|---|---|---|
| RADIO ACCESS CHANNEL | | IP PORT |
| K | | 5 |
| | | 8 |

| UNALLOCATED DATA OF BTS 12-2 | | |
|---|---|---|
| RADIO ACCESS CHANNEL | | IP PORT |
| F | | 5 |
| K | | 8 |

Fig.10

| ALLOCATED DATA OF BTS 12 | |
|---|---|
| RADIO ACCESS CHANNEL | IP PORT |
| B | 2 |
| D | 6 |
| E | 4 |

| UNALLOCATED DATA OF BTS 12 NO. 1 | |
|---|---|
| RADIO ACCESS CHANNEL | ALLOCATION PRIORITY |
| A | ① |
| F | ② |
| K | ③ |

| UNALLOCATED DATA OF BTS 12 NO. 2 | |
|---|---|
| RADIO ACCESS CHANNEL | ALLOCATION PRIORITY |
| 3 | ② |
| 5 | ③ |
| 8 | ① |

Fig.11

| ALLOCATED DATA OF BTS 12 | |
|---|---|
| RADIO ACCESS CHANNEL | IP PORT |
| B | 2 |
| D | 6 |
| E | 4 |
| A | 8 |

| UNALLOCATED DATA OF BTS 12 NO. 1 | |
|---|---|
| RADIO ACCESS CHANNEL | ALLOCATION PRIORITY |
| F | ① |
| K | ② |

| UNALLOCATED DATA OF BTS 12 NO. 2 | |
|---|---|
| RADIO ACCESS CHANNEL | ALLOCATION PRIORITY |
| 3 | ① |
| 5 | ② |

RESOURCE ALLOCATION CONTROL DEVICE, RESOURCE ALLOCATION CONTROL METHOD, AND MOBILE COMMUNICATION SYSTEM

BACKGROUND OF THE INVENTION

1. Field of the Invention

The present invention relates to a resource allocation control device, resource allocation control method, and mobile communication system.

2. Related Background Art

Conventionally, in a mobile communication system, including systems conforming to 3GPP (3rd Generation Partnership Project), a connection between a radio access network (hereafter called "RAN") and a network by asynchronous transfer mode (hereafter called "ATM") has been implemented (e.g. see "IDG information communication series wireless broadband textbook, (pp. 134–228, IDG Japan)"). Also a connection between an IP network such as an inter-computer network using IPv4 or IPv6 as the communication protocol, and a network implemented by ATM, has been attempted (e.g. Japanese Patent Application Laid-Open No. Heisei 11- 41293).

However a connection between a RAN and an IP network has not been implemented as a heterogeneous network connection. Both the connection between homogeneous networks and the connection between heterogeneous networks have been implemented or attempted in a limited range, and it is possible to implement a connection between a RAN and IP network by current technology. In this case, communication resources must be managed so that the compatibility of the format of communication data which is transmitted/received between the RAN and IP network can be maintained.

For this, the method described below may be adopted. When the communication data is sent from the RAN to the IP network, for example, the communication data is decoded for each single transport block of the radio access channel as the RAN resource, and the data content is decoded individually to acquire the information on the transmission destination. Then the transmission destination in the IP network is specified and the data is converted into IP packets based on the transmission destination information.

However, in this method where the communication data in enormous number of transport blocks transmitted from the radio access channel is decoded each time the data is transmitted, and the data is converted into packets, the control load of communication between networks increases and an excessive delay may occur due to the conversion. Currently for bi-directional communication between RAN and various networks, the communication which has some characteristics of high-speed, large capacity, high reliability and high quality, is certainly demanded by the market, and with this current situation in mind, the above mentioned increase of control load and the increase in delay are considered as major problems.

With the foregoing in view, it is an object of the present invention to provide a resource allocation control device and method which can sufficiently decrease the control load and delay when the RAN and IP network are connected, and a mobile communication system which implements the bi-directional communication which has some characteristics of high-speed, large capacity, high reliability and high quality, by the resource allocation control.

SUMMARY OF THE INVENTION

To solve the above problems, the resource allocation control device according to the present invention is connected to an IP network and a RAN which has a base transceiver station (hereafter called "BTS") to which a mobile station (hereafter called "MS") is connected and a base station controller (hereafter called "BSC") connected to the BTS, comprising corresponding means for corresponding radio access channels used for communication between the MS and the BTS, and transmission/reception ports used for communication between the RAN and the IP network, storing means for storing the information on the corresponded radio access channels and transmission/reception ports, and allocation/assignment means for allocating or assigning one of the radio access channels and the transmission/reception ports to the other, based on the information on the corresponded radio access channels and the transmission/reception ports.

In a resource allocation control device configured in this way, the corresponding means corresponds the radio access channels and the transmission/reception ports at the RAN side. Then the storing means edits, reedits and holds the corresponded relationship between the radio access channels and the transmission/reception ports as a data base of the correspondence table. And based on this correspondence information of the data base, the radio access channels and the transmission/reception ports are dynamically allocated/assigned. By this, the RAN and the IP network can be connected without converting data for each transport block, so that the compatibility of the data format of each of the RAN and the IP network is maintained.

Specifically, it is preferable that the corresponding means further comprises a request acceptance section for accepting the request for resource allocation or assignment sent from the RAN or IP network, and a corresponding processing section for corresponding one of the radio access channels and the transmission/reception ports to the other when the request is accepted.

By this, dynamic resource allocation can be easily implemented for certain and on time for a traffic request by access or communication from both the RAN and the IP network. Examples of the resource allocation or assignment requests include an IP packet allocation request from the IP network via the IP port and the port, and a radio access channel allocation request from the RAN.

It is preferable that the transmission/reception port is an IP address or an IP port. By this, the information that the IP packet originally has (inherent information), which is conventionally used in the IP network, and the radio access channel of the RAN, can be corresponded smoothly. Therefore the compatibility with conventional IP packets can be maintained, and it is not needed to modify the data format on the IP network.

Further, it is more preferable that the number of at least one of the corresponded radio access channels and transmission/reception ports is plural.

In this case, even if the data capacity or the number of transmission/reception ports of a single radio access channel is limited, a plurality of radio access channels and/or transmission/reception ports can be corresponded and finally allocated, so the load and the delay due to such a limitation can be suppressed. Also when there are a plurality of nodes, the resources to be used for multi-cast communication can be reduced.

Further, it is more preferable that the corresponding means corresponds one of the radio access channels and the transmission/reception ports to the other, based on the information of the allocation priority of each of the radio access channels and the transmission/reception ports.

At this time, the allocation priority may be held in advance by the storing means as the inherent information of the radio access channels and/or transmission/reception ports. The allocation priority may be dynamically generated according to the external load or the operating conditions, such as communication traffic, number of nodes, and the communication method, and be held by the storing means at each time.

This makes it easier to optimize processing for allocating the radio access channels and the transmission/reception ports appropriately, according to the service type used by the user of the RAN and IP network and the quality thereof, or according to the traffic requirements. Therefore the response time and the throughput demanded for each communication can be implemented for certain.

The resource allocation control method according to the present invention is a method which is effectively implemented using the resource allocation control device of the present invention, and is a method for allocating or assigning a resource in communication between a RAN, which has a BTS to which an MS is connected and a BSC which is connected to the BTS, and an IP network, comprising a corresponding step for corresponding radio access channels used for communication between the MS and the BTS, and transmission/reception ports used for communication between the RAN and the IP network, a storing step for storing the information on the corresponded radio access channels and transmission/reception ports, and an allocation/assignment means for allocating or assigning one of the radio access channels and the transmission/reception ports to the other, based on the information on the corresponded radio access channels and the transmission/reception ports.

More specifically, it is preferable that the corresponding step further comprises a request acceptance step of accepting the request for resource allocation or assignment sent from the radio access network or IP network, and a corresponding processing step of corresponding one of the radio access channels and the transmission/reception ports to the other when the request is accepted.

Also in the corresponding step, it is preferable to correspond one of the radio access channels and the transmission/reception ports to the other, based on the information on the allocation priority of each of the radio access channels and the transmission/reception ports.

The mobile communication system according to the present invention is configured using the resource allocation control method and the resource allocation control device of the present invention, comprising; a RAN which has a BTS to which an MS is connected and BSC which is connected to the BTS, an IP network, and the resource allocation control device connected to the RAN and the IP network, further comprising corresponding means for corresponding radio access channels used for communication between MS and BTS, and transmission/reception ports used for communication between the RAN and the IP network, storing means for storing the information on the corresponded radio access channels and transmission/reception ports, and allocation/assignment means for allocating or assigning one of the radio access channels and the transmission/reception ports to the other, based on the information on the corresponded radio access channels and transmission/reception ports.

BRIEF DESCRIPTION OF THE DRAWINGS

FIG. 5 is a data table showing the key sections of the allocation data base 33 after executing step SP34.

FIG. 8 is a data table showing the key sections of the allocation data base 33 before executing the correspondence of the radio access channels and the IP ports in the third embodiment of the resource allocation control method according to the present invention.

FIG. 9 is a data table showing the key sections of the allocation data base 33 after executing the correspondence of the radio access channels and the IP ports in the third embodiment of the resource allocation control method according to the present invention.

FIG. 10 is a data table showing the key sections of the allocation data base 33 before executing the correspondence of the radio access channels and the IP ports in the fourth embodiment of the resource allocation control method according to the present invention.

FIG. 11 is a data table showing the key sections of the allocation data base 33 after executing the correspondence of the radio access channels and the IP ports in the fourth embodiment of the resource allocation control method according to the present invention.

DESCRIPTION OF THE PREFERRED EMBODIMENTS

Figure 1:
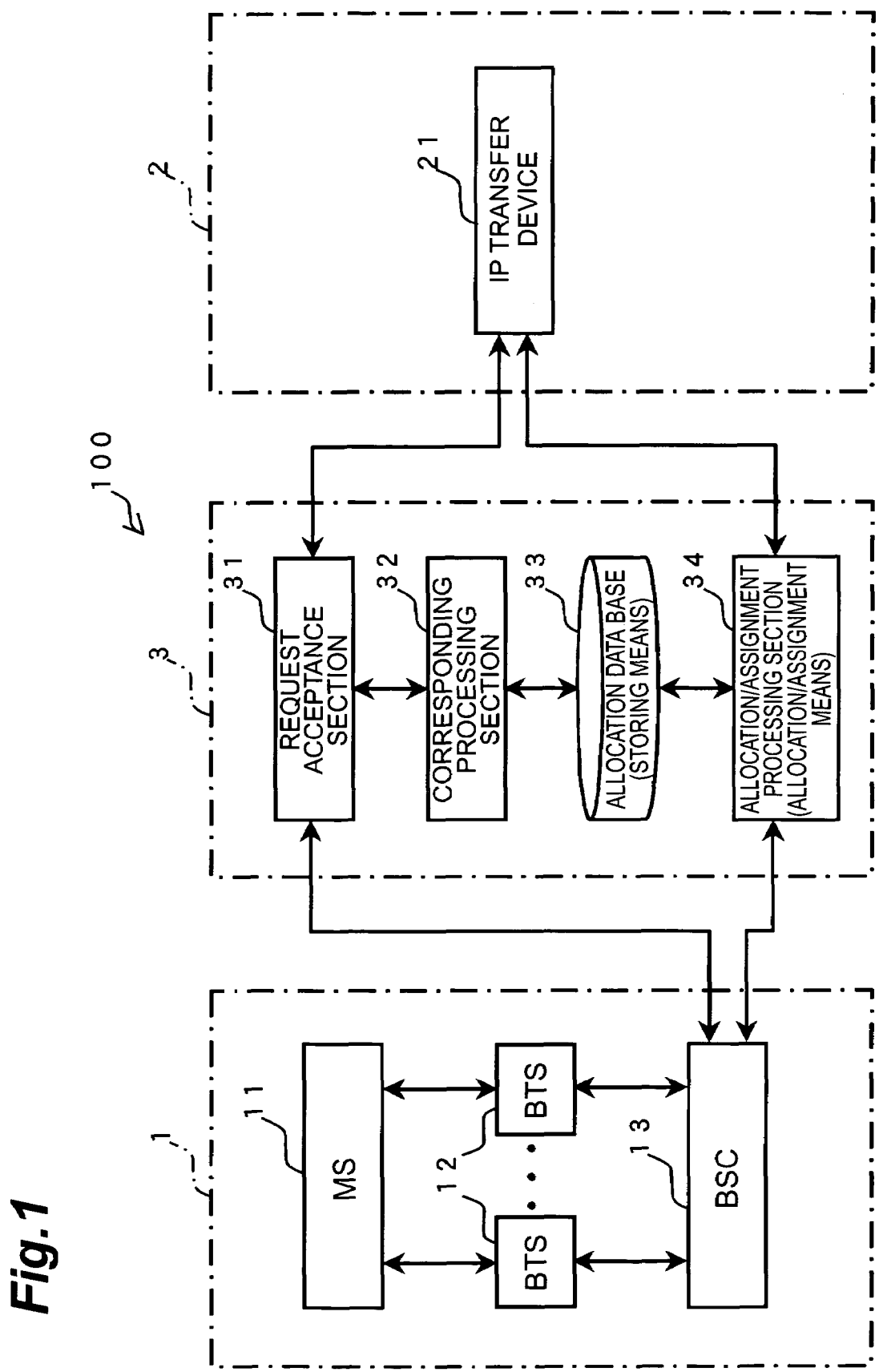
FIG. 1 is a block diagram depicting a general configuration example of the mobile communication system including the resource allocation control device according to the present invention.

Embodiments of the present invention will now be described in detail. FIG. 1 is a block diagram depicting a general configuration example of the mobile communication system including the resource allocation control device according to the present invention. The mobile communication system 100 is comprised of the RAN 1 and the IP network 2, which are connected to each other via the resource allocation control device 3. The RAN 1 is a network system conforming to 3GPP, for example, and is comprised of MS 11 which is a UE (User Equipment), a plurality of BTSs 12, which are the logic nodes (node B) for the radio link and are connected to the MS 11, and BSC 13 is the RNC (Radio Network Controller) in charge of resource control and is connected to these BTSs 12.

On the other hand, the IP network 2 has an IP transfer device 21 which is the gateway, for example, such as SGSN (Serving GPRS Support Node) for general packets. More particularly, "SGSN" is a device for performing the location management of the MS 11 for the packet switching connection and for the transfer control of packet traffic.

In the resource allocation control device 3, which intervenes between the RAN 1 and the IP network 2, the request acceptance section 31, corresponding processing section 32, allocation data base 33 (storing means) and allocation/assignment processing section 34 (allocation/assignment means) are sequentially connected. Each of the BSC 13 in the RAN 1 and the IP transfer device 21 in the IP network 2 is connected to both the request acceptance section 31 and the allocation/assignment processing section 34.

The request acceptance section 31 is for accepting the request for resource allocation or assignment sent from the BSC 13 or the IP transfer device 21, and the corresponding processing section 32 has the function of corresponding the radio access channels (which are the radio resources) at the RAN 1 side and the IP ports (transmission/reception ports) used for communication between RAN 1/IP network 2 when the request is received, in other words, allocating the radio access channels and the IP ports in advance. In this way, the corresponding means is comprised of the request acceptance section 31 and the corresponding processing section 32.

The allocation data base 33 is for storing and holding the allocation information, and the information can be written/read by the corresponding processing section 32 and the allocation/assignment processing section 34, and the data base is updated each time the information is changed. The allocation/assignment processing section 34 is for allocating or assigning unallocated radio access channels and IP ports, based on the data base information.

Figure 2:
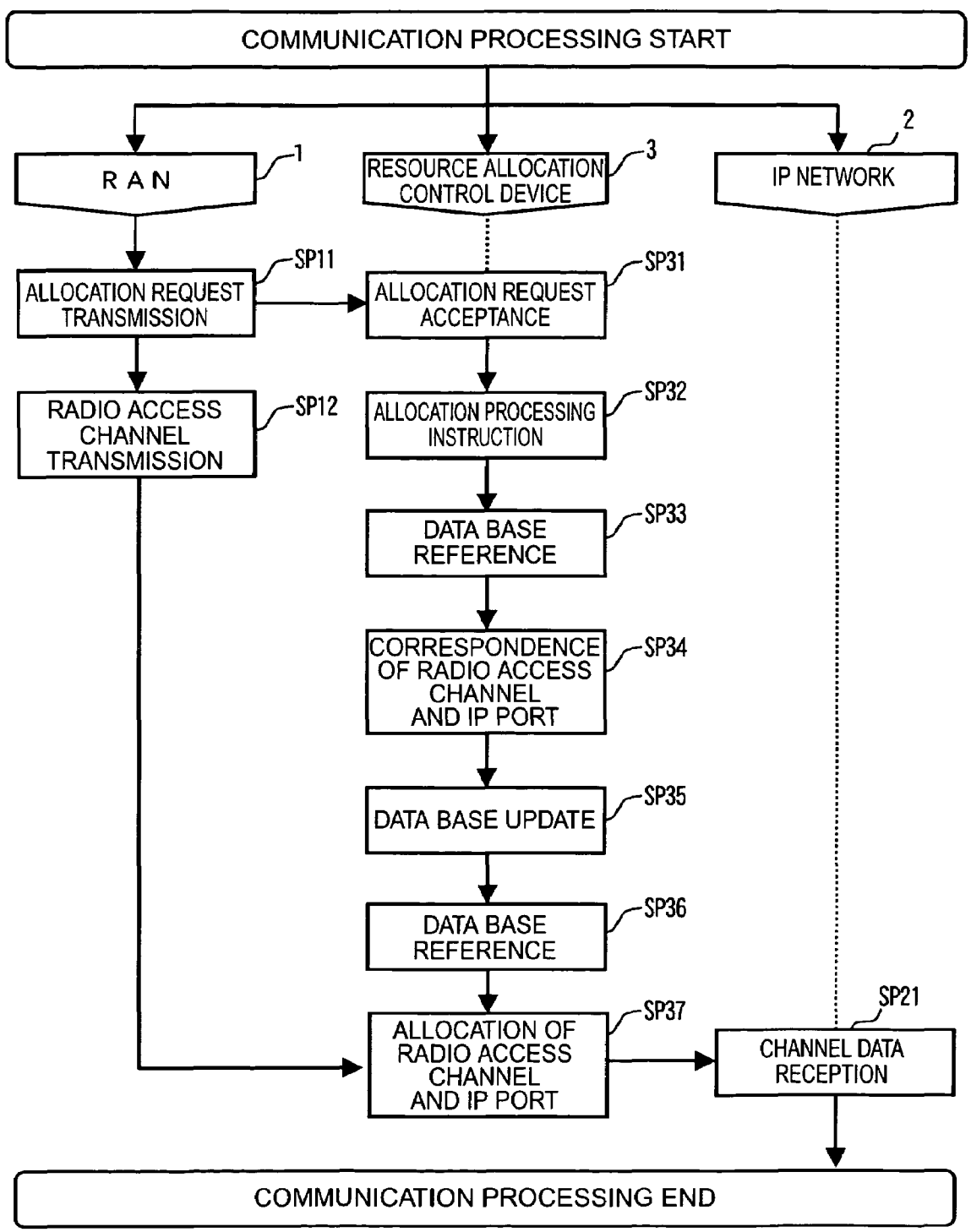
FIG. 2 is a flow chart depicting a communication processing procedure using the first embodiment of the resource allocation control method according to the present invention.
Figure 3:
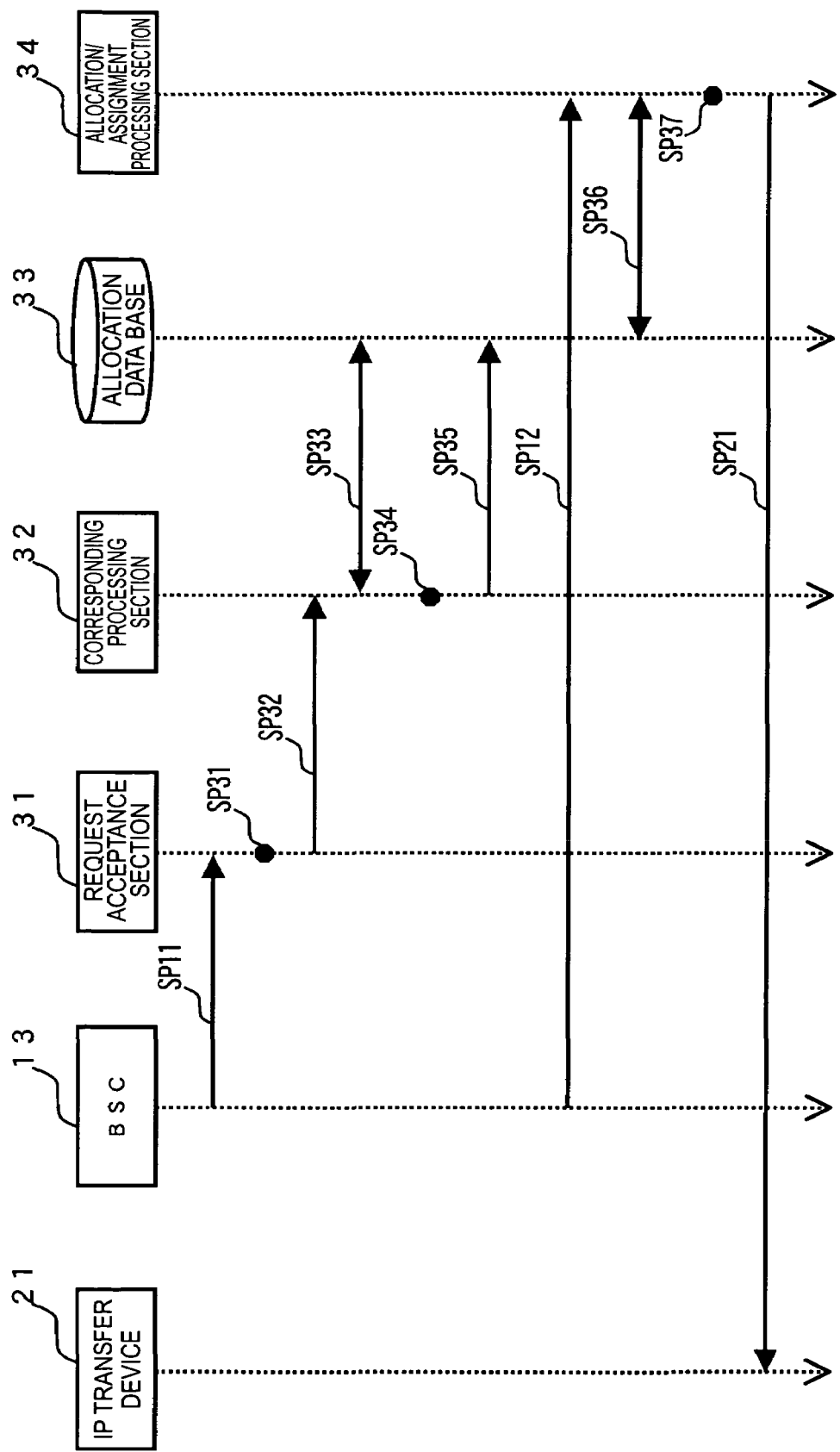
FIG. 3 is a diagram depicting the communication status between the components of the mobile communication system 100 caused by the procedure according to the flow chart shown in FIG. 2.

An example of the procedure to execute the resource allocation control method according to the present invention in the mobile communication system 100 constructed as above will now be described. FIG. 2 is a flow chart depicting the communication processing procedure using the first embodiment of the resource allocation control method according to the present invention. FIG. 3 is a diagram depicting the communication status between the components of the mobile communication system 100 caused by the procedure according to this flow. Here an example of communication processing, in which transmission from the RAN 1 is the trigger, is shown. In FIG. 3, the horizontal arrow shown by a solid line indicates the flow of a signal or processing, and the vertical dotted line from each component indicates the processing with each component performed on that line, and the direction of the arrow attached to the vertical dotted line indicates the general time series (this is the same for FIG. 7).

After setting the connection of MS 1 and RRC (Radio Resource Control), the BSC 13 in RAN 1 selects an unallocated radio access channel to be used for communication between the MS 1 and each BTS 12 according to the Active PDP Context Request, which is a packet transfer path setting request, and sends an allocation request for corresponding the unallocated IP port to the radio access channel, to the request acceptance section 31 of the resource allocation control device 3 (step SP 11). "RRC" is a protocol in layer 3 for controlling the radio resource, and for setting the radio bearer and reporting system information and paging information from the network to the MS 11.

The request acceptance section 31 accepts this allocation request (step SP 31: request acceptance step) and sends the instruction for the corresponding radio access channel and the IP port to the corresponding processing section 32 (step SP 32). The corresponding processing section 32, which received the instruction, refers to the content of the allocation data base 33 (step SP 33), selects an unallocated IP port, and corresponds the IP port to the radio access channel for which allocation is requested (step SP 34: corresponding processing step). In this way, the corresponding step is comprised of steps SP 31–SP 34.

Figure 4:
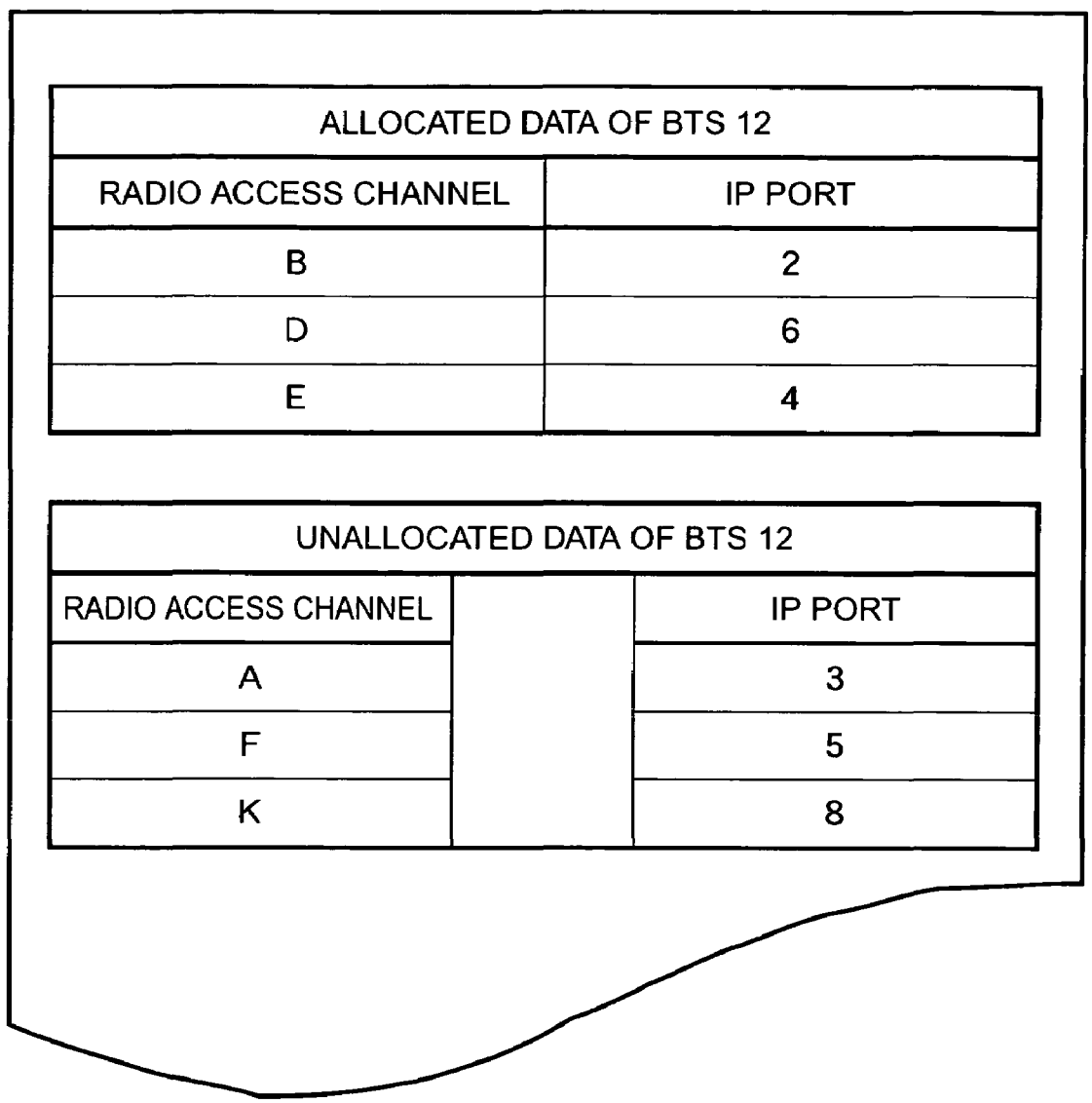
FIG. 4 is a data table showing the key sections of the allocation data base 33 before executing step SP34.

Then the corresponding processing section 32 writes information on the radio access channel and the IP port, which are corresponded to each other, to the allocation data base 33, and updates the data table (step SP 35: storing step). By this, the radio access channel and the IP port, which are corresponded to each other, are stored and held in the allocation data base 33. FIG. 4 is data table showing the key sections of the allocation data base 33 before executing step SP 34. FIG. 5 is data table showing the key sections of the allocation data base 33 after executing step SP 34.

In FIG. 4 and FIG. 5, in the allocation data base 33, the allocated data and unallocated data exist for each BTS 12, which is node B under the control of BSC 13 which corresponds to RNC. In the case of the example in FIG. 4, before step SP 34, that is, before corresponding the radio access channel for which allocation is requested (radio access channel A in this case) to the IP port which should be allocated ("IP port 3" in this case), the radio access channels B, D and E are corresponded to the IP ports 2, 6 and 4 respectively, the radio access channels A, F and K are in an unallocated status, and the IP ports 3, 5 and 8 are in an unused status in the allocated data table.

When the radio access channel A is corresponded to the unallocated "IP port 3" in step SP 34, the data table of the allocation data base 33 is modified such that this combination (the radio access channel A and the unallocated "IP port 3") is added to the allocated data, and also the radio access channel A and the "IP port 3" are deleted from the unallocated data, as shown in FIG. 5.

Then the radio access channel A, sent from BSC 13 (step SP 12), is sent (transferred) to the allocation/assignment processing section 34, and the allocation/assignment processing section 34 refers to the content of the allocation data base 33 (step SP 36). Also the allocation/assignment processing section 34 recognizes the information on the IP port to which the radio access channel A should be allocated, that is recognizes that "the corresponded IP port is "IP port 3"", and allocates the radio access channel A to the "IP port 3" based on the information. When the allocation request is sent to another radio access channel, the allocation/assignment processing section 34 updates the correspondence and the data table for each radio access channel as described above, and assigns a plurality of radio access channels to a predetermined IP port (step SP 37: allocation/assignment step).

In this step, the radio access channel A and the "IP port 3" are connected to each other, and the communication from the RAN 1 via the radio access channel A to the IP network 2 (the "IP port 3") is enabled (step SP 21). On the other hand, the IP packet which passed through the "IP port 3", is sent (transferred) to the allocation/assignment processing section 34 of the resource allocation control device 3, and the allocation/assignment processing section 34 refers to the allocation data base 33, and based on the allocation data base 33, assigns "IP port 3" to the radio access channel A. For convenience of explanation, the latter flow is omitted in FIG. 2 and FIG. 3.

Figure 6:
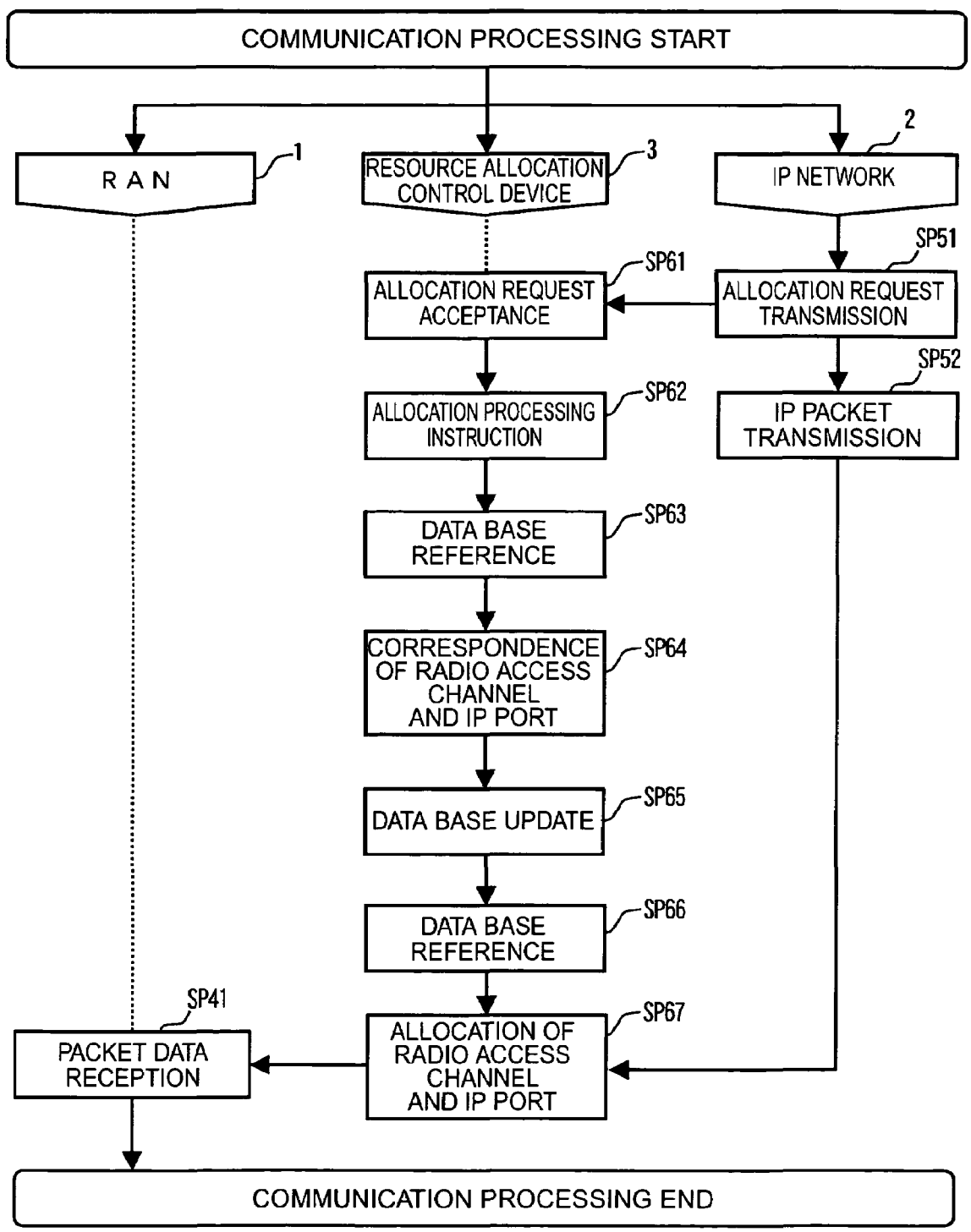
FIG. 6 is a flow chart depicting the communication processing procedure using the second embodiment of the resource allocation control method according to the present invention.
Figure 7:
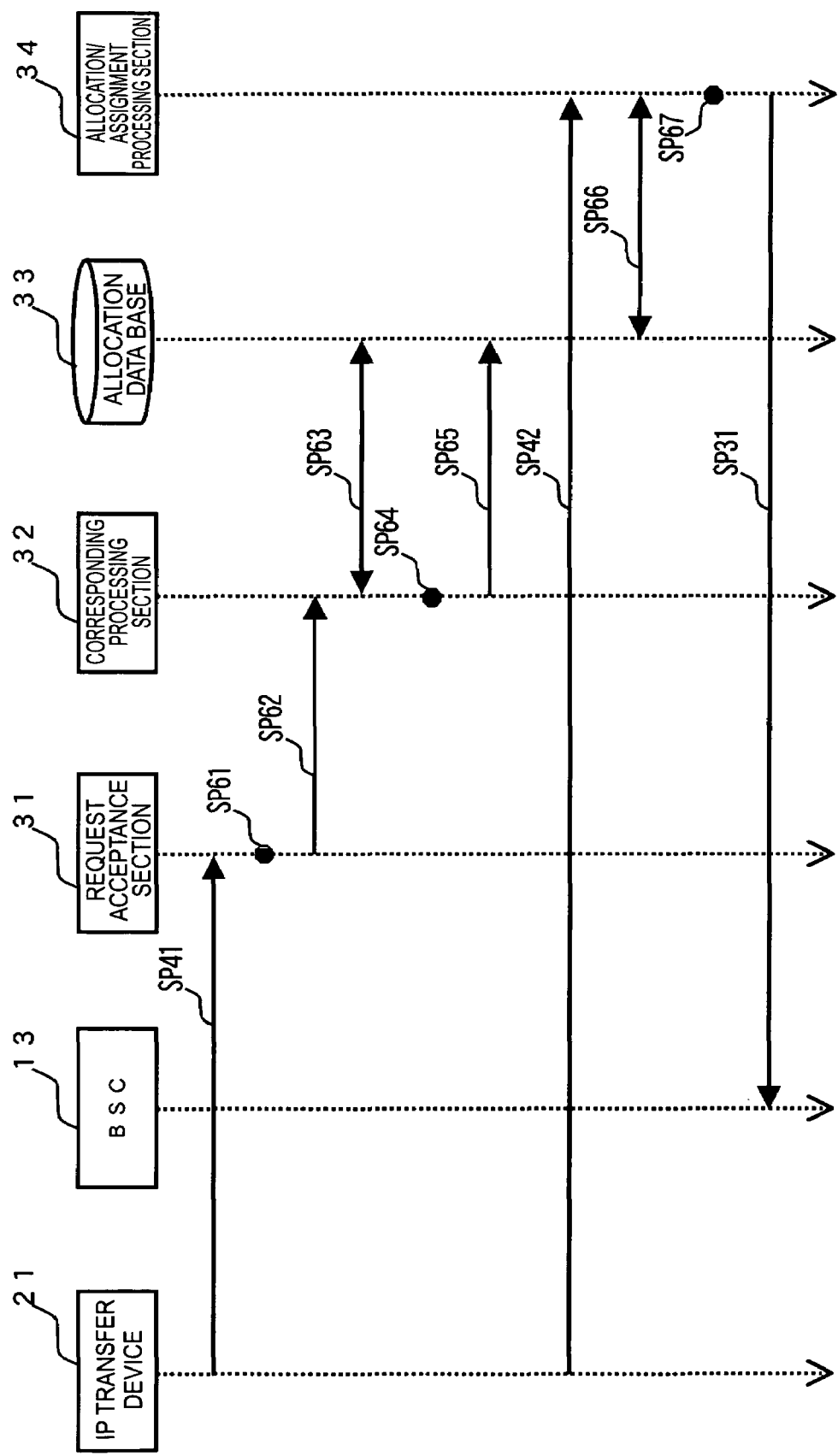
FIG. 7 is a diagram depicting the communication status between the components of the mobile communication system 100 caused by the procedure according to the flow chart shown in FIG. 6.

FIG. 6 is a flow chart depicting the communication processing procedure using the second embodiment of the resource allocation control method according to the present invention. FIG. 7 is a diagram depicting the communication status between the components of the mobile communication system 100 caused by the procedure according to the flow chart. Here an example of communication processing, in which transmission from the IP network 2 is the trigger, is shown.

At first, the IP transfer device 21 in the IP network 2 receives the IP packet to be transmitted to the MS 1 of the RAN 1, and allocates the IP port to the IP packet, and sends an allocation request for corresponding the unallocated radio access channel to the IP port, to the request acceptance section 31 of the resource allocation control device 3 (step SP 51).

The request acceptance section 31 accepts this allocation request (step SP 61: request acceptance step) and sends the instruction for corresponding the IP port to the radio access channel, to the corresponding processing section 32 (step SP 62). The corresponding processing section 32, which received the instruction, refers to the content of the allocation data base 33 (step SP 63), selects an unallocated radio access channel, and corresponds the radio access channel to the IP port for which allocation is requested (step SP 64: corresponding processing step). In this way, the corresponding step is comprised of steps SP 61–SP 64.

Then the corresponding processing section 32 writes the information on the IP port and the radio access channel which are corresponded each other, to the allocation data base 33, and updates the data table (step SP 65: storing step). By this, the information on the IP port and the radio access channel are stored and held in the allocation data base 33. If the IP port for which allocation is requested, is "IP port 3" and the radio access channel to be allocated thereto is radio access channel A, the data table of the allocation data base 33 before and after executing step SP 64, can be written in the same way as those shown in FIG. 4 and FIG. 5. Detailed descriptions are omitted here to avoid redundant explanations.

Then the IP packet sent from the IP transfer device 21 (step SP 52) is sent (transferred) to the allocation/assignment processing section 34, and the allocation/assignment processing section 34 refers to the content of the allocation data base 33 (step SP 66). Also the allocation/assignment processing section 34 recognizes the information on the radio access channel to which the "IP port 3", corresponding to the IP packet 3, should be allocated, that is recognizes that "the corresponded radio access channel is the radio access channel A", and allocates the "IP port 3" to the radio access channel A based on the information. When the allocation request is sent to another IP port, the allocation/assignment processing section 34 updates the correspondence and the data table for each IP port as described above, and assigns a plurality of IP ports to a predetermined radio access channel (SP 37; allocation/assignment step).

In this way, the "IP port 3" and the radio access channel A are connected to each other, and the communication from the RAN 1 via the radio access channel A to the IP network 2 (the "IP port 3") is enabled (step SP 41). On the other hand, the transmission data which passed through the radio access channel A, is sent (transferred) to the allocation/assignment processing section 34 of the resource allocation control device 3, and the allocation/assignment processing section 34 refers to the allocation data base 33, and based on the allocation data base 33, assigns the transmission data to the "IP port 3". For convenience of explanation, the latter flow is omitted in FIG. 6 and FIG. 7.

According to the resource allocation control device 3 configured in this way, the resource allocation control method using this resource allocation control device 3 and the mobile communication system 100 using this resource allocation control device and method, the request acceptance section 31 and the corresponding processing section 32 correspond one of the radio access channels and the IP ports for which allocation is requested, to the other. By this, a virtual resource allocation or resource reservation is implemented. The relationship of the radio access channels and the IP ports which are corresponded to each other, is held by the data table of the allocation data base 33, and the allocation/assignment processing section 34 refers to the content of the allocation data base 33, and based on this content, the allocation/assignment processing section 34 dynamically allocates the transmission/reception ports to the radio access channels according to the allocation request.

Therefore the connection of the RAN 1 and the IP network 2 can be implemented without changing the respective data format for each transport block. So an increase of the control load can be avoided and a data delay, due to such causes as data conversion, can be sufficiently decreased. Also data defects and data loss can be sufficiently avoided when traffic load is high. Since dynamic resource allocation is performed in this way, the efficiency of using resources and band frequencies can be improved. As a result, in the mobile communication system 100, the bi-directional communication which has characteristics of high-speed, large capacity, high reliability and high quality can be implemented.

When allocation is requested to the request acceptance section 31, the radio access channel and the IP port are corresponded, so dynamic resource allocation can be easily implemented for certain and on time for a traffic request by access or communication from both the RAN 1 and the IP network 2. By this, the control load can be further reduced.

Also the transmission/reception port to which a radio access channel is allocated, is an IP port, so it is easy to correspond the information originally owned by the IP packet, which is conventionally used for the IP network 2, to the radio access channel in the RAN 1. Therefore compatibility with a conventional IP packet can be sufficiently maintained and it is not needed to modify the data format on the IP network. Therefore the control load and the delay can be further reduced and the demand for higher speeds can be met.

Now another embodiment will be described with reference to FIG. 8 and FIG. 9. FIG. 8 is a data table showing the key sections of the allocation data base 33 before executing the correspondence of the radio access channel and the IP port in the third embodiment of the resource allocation control method according to the present invention. FIG. 9 is a data table showing the key sections of the allocation data base 33 after executing the correspondence of the radio access channel and the IP port in the third embodiment of the resource allocation control method according to the present invention. In the present embodiment, the allocation data base 33 holds the allocated information and unallocated information of the radio access channel and the IP port for each BTS 12. The difference from FIG. 2 or FIG. 6 is that not only a single radio access channel and single IP port are corresponded to each other, but a plurality (2 in this case) of IP ports or radio access channels are allocated corresponding to a single radio access channel or IP channel, and the rest of the procedure is executed the same way as FIG. 2 or FIG. 6.

In other words, in FIG. 8 and FIG. 9, in the allocation data base 33, the allocated data and the unallocated data exist for each BTS 12 (referred to as BTS 12-1 and BTS 12-2 for convenience of explanation) which is node B under the control of the BSC 13 which corresponds to RNC. Here an example when an allocation is requested for the radio access channels A and B of BTS 12-1 and the radio access channel C of the BTS 12-2, and the IP port to be allocated is "IP port 3" is shown.

In this case, as FIG. 8 shows, before the correspondence of the radio access channels and the IP ports is executed, in the allocated data table of the BTS 12-1, the radio access channel C is corresponded to the IP port 2 and 9, the radio access channel D is corresponded to the IP port 6, and the radio access channel E and J are corresponded to the IP port 4. In the allocated data table of the BTS 12-2, the radio access channel B is corresponded to the IP port 8, the radio access channel D is corresponded to the IP port 6, and the radio access channel E and J are corresponded to the IP port 4. The radio access channels A, B and K of the BTS 12-1 and the radio access channels C, F and K of the BTS 12-2 are in unallocated status, and the IP ports 3, 5 and 8 are in unused status.

And when the radio access channels and the IP ports are corresponded in steps SP 34 and SP 64, the data table of the allocation data base 33 is modified so that both the radio access channels A and B of the BTS 12-1 are corresponded to the "IP port 3", this combination is added to the allocated data, and the radio access channels A and B and the "IP port 3" are deleted from the unallocated data, as shown in FIG. 9. At the same time, the data table of the allocation data base 33 is modified so that the radio access channel C of the BTS 12-2 is corresponded to the "IP port 3", this combination is added to the allocated data, and the radio access channel C and the "IP port 3" are deleted from the unallocated data.

When this resource allocation control method is implemented, functional effects similar to the above mentioned first and second embodiments are exhibited, and additionally, even if the data capacity of a single radio access channel of each BTS 12 is limited or if the number of IP ports and the number of IP addresses are limited, a plurality of radio access channels or IP ports can be assigned to the other, and by this, the control load and the delay due to the wait time caused by such limitations, can be reduced. Also when there are a plurality of BTSs 12, that is node B, as shown in FIG. 1, the resources to be used for multi-cast communication can be reduced, and resources can be effectively used, and the load of the entire system can be further reduced.

Another embodiment will now be described with reference to FIG. 10 and FIG. 11. FIG. 10 is a data table showing the key sections of the allocation data base 33 before executing the correspondence of the radio access channels and the IP ports in the fourth embodiment of the resource allocation control method according to the present invention. FIG. 11 is a data table showing the key sections of the allocation data base 33 after executing the correspondence of the radio access channels and the IP ports in the fourth embodiment of the resource allocation control method according to the present invention. In the present embodiment, the difference from FIG. 2 or FIG. 6 is that the allocation data base 33 holds the information on the allocation priority of each of the radio access channels and the IP ports in the unallocated data table of BTS 12, and the rest of the procedure is executed the same way as FIG. 2 or FIG. 6.

In other words, as FIG. 10 shows, the radio access channels B, D and E are corresponded to the IP ports 2, 6 and 4 respectively in the allocated data table of the BTS 12, and the radio access channels A, F and K of the BTS 12 are in unallocated status and the IP ports 3, 5 and 8 are in unused status before the correspondence of the radio access channels and the IP ports is executed.

The sequence (priority) to be allocated when allocation is requested, is stored in the same data table in association with the unallocated radio access channel or the IP port respectively. In this example, it is assumed that the radio access channel A is No. 1, the radio access channel F is No. 2 and the radio access channel K is No. 3, and the IP port 8 is No. 1, the IP port 3 is No. 2 and the IP port 5 is No. 3, and when an allocation is requested, the radio access channels and the IP ports are corresponded to each other so as to be combined in this sequence.

And when one allocation request is received, for example, the radio access channel A and the IP port 8, which are priority No. 1, are corresponded in steps SP 34 and SP 64, and as FIG. 11 shows, the data table of the allocation data base 33 is modified such that the above-mentioned combination is added to the allocated data, and the radio access channel A and the IP port 8 are deleted from the unallocated data. At the same time, priority of the radio access channels and the IP ports included in the unallocated data table increases by one respectively, in preparation for the next allocation request.

Using this resource allocation control method also exhibits functional effects similar to the first embodiment and the second embodiment mentioned above, and additionally the allocation of the radio access channels and the IP ports can be more easily optimized according to the service type used by the user of the RAN 1 and the IP network 2, the quality thereof (QoS), and the traffic requirements. Therefore the response time and the throughput demanded for each communication can be easily achieved, and high-speed communication between the RAN 1 and the IP network 2 can be implemented for certain.

The present invention was described above in detail based on the embodiments thereof, but the present invention is not limited to these embodiments, but can be variously modified in a range which does not deviate from the essential characteristics thereof. For example, there may be a single BTS 12, and there may be a plurality of MSs 11 and BSCs 13. The transmission/reception port to be allocated to the radio access channel, may be an IP address instead of or in addition to an IP port. A plurality of IP ports or IP addresses may be allocated to a plurality of radio access channels. The allocation priority may be held in the allocation data base 33 in advance, as the inherent information of the radio access channel and/or the transmission/reception port, or may be dynamically generated according to the external load or operating conditions, such as traffic, number of nodes, and the communication method, and may be stored in the allocation data base as needed.

As described above, according to the resource allocation control device and the resource allocation control method of the present invention, the radio access channels and the transmission/reception ports used for communication of the RAN and the IP network, are corresponded and allocated/assigned, so when the RAN and the IP network are connected, it is not needed to decode and convert communication data, and therefore the control load and the delay can be sufficiently reduced. Also according to the mobile communication system of the present invention, which uses the resource allocation control device and the resource allocation control method of the present invention, the bi-directional communication which has the characteristics of high-speed, large capacity, high reliability and high quality can be implemented.

What is claimed is:

1. A resource allocation control device connected to a radio access network, which has a base transceiver station to which a mobile station is associated and a base station controller connected to said base transceiver station, and an IP network, comprising:

corresponding means for corresponding radio access channels used for communication between said mobile station and said base transceiver station, and transmission/reception ports used for communication between said radio access network and said IP network;

storing means for storing information of corresponded radio access channels and transmission/reception ports; and allocation/assignment means for allocating or assigning one of said radio access channels and said transmission/reception ports to the other, based on the information of said corresponded radio access channels and transmission/reception ports wherein said corresponding means corresponds one of said radio access channels and said transmission/reception ports to the other, based on an allocation priority of each of said radio access channels and each of said transmission/reception ports.

2. The resource allocation control device according to claim 1, wherein said corresponding means further comprising:

a request acceptance section configured to accept a request for resource allocation or assignment sent from said radio access network or said IP network; and corresponding processing section configured to correspond said one of said radio access channels and said transmission/reception ports to the other when said request is accepted.

3. The resource allocation control device according to claim 1, wherein at least one of said transmission/reception ports is an IP address or an IP port.

4. The resource allocation control device according to claim 1, wherein a number of at least one of said corresponded radio access channels and transmission/reception ports, is plural.

5. A resource allocation control method for allocating or assigning a resource used for communication between a radio access network, which has a base transceiver station to which a mobile station is associated and a base station controller which is connected to said base transceiver station, and an IP network, comprising:

corresponding radio access channels used for communication between said mobile station and said base transceiver station, and transmission/reception ports used for communication between said radio access network and said IP network;

storing information of corresponded radio access channels and transmission/reception ports; and allocating or assigning one of said radio access channels and said transmission/reception ports to the other, based on the information of said corresponded radio access channels and transmission/reception ports, wherein said corresponding corresponds said one of said radio access channels and said transmission/reception ports to the other, based on an allocation priority of each of said radio access channels and each of said transmission/reception ports.

6. A mobile communication system, comprising:

a radio access network which has a base transceiver station to which a mobile station is associated and a base station controller which is connected to said base transceiver station;

an IP network; and a resource allocation control device connected to said radio access network and said IP network, comprising corresponding means for corresponding radio access channels used for communication between said mobile station and said base transceiver station, and transmission/reception ports used for communication between said radio access network and said IP network, storing means for storing information of corresponded radio access channels and transmission/reception ports, and allocation/assignment means for allocating or assigning one of said radio access channels and said transmission/reception ports to the other, based on the information of said corresponded radio access channels and transmission/reception ports, wherein said corresponding corresponds one of said radio access channels and said transmission/reception ports to the other, based on an allocation priority of each of said radio access channels and each of said transmission/reception ports.

* * * * *